US008169950B2

(12) United States Patent
Shen et al.

(10) Patent No.: US 8,169,950 B2
(45) Date of Patent: May 1, 2012

(54) SELECTION OF ORTHOGONAL COVERING SEQUENCES AND PHASE RAMPED SEQUENCES

(75) Inventors: Zukang Shen, Richardson, TX (US); Tarik Muharemovic, Dallas, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 995 days.

(21) Appl. No.: 12/136,221

(22) Filed: Jun. 10, 2008

(65) Prior Publication Data

US 2008/0316957 A1 Dec. 25, 2008

Related U.S. Application Data

(60) Provisional application No. 60/945,480, filed on Jun. 21, 2007, provisional application No. 60/969,200, filed on Aug. 31, 2007.

(51) Int. Cl.
*H04W 4/00* (2009.01)
(52) U.S. Cl. .......................... 370/328; 370/203; 370/310
(58) Field of Classification Search .................. 370/203, 370/310, 328
See application file for complete search history.

(56) References Cited

U.S. PATENT DOCUMENTS

2002/0172184 A1 11/2002 Kim et al.
2004/0085919 A1 5/2004 Song et al.

FOREIGN PATENT DOCUMENTS

KR 10-2005-0067335 A 7/2005

OTHER PUBLICATIONS

Texas Instruments, "Coherent Uplink ACK/NAK Transmission with High Speed UEs", #GPP TSG RAN WG1 #50, Agenda Item: 7.2.4., Athens, Greece, Aug. 20-24, 2007, pp. 1-4.
Texas Instruments, U.S. Appl. No. 12/129,378, "Allocation of Block Spreading Sequences" (Inventor: Zukang Shen, et al.), filed May 29, 2008.

*Primary Examiner* — Jeffrey Pwu
*Assistant Examiner* — Farhad Ali
(74) *Attorney, Agent, or Firm* — Robert D. Marshall, Jr.; Wade James Brady, III; Frederick J. Telecky, Jr.

(57) ABSTRACT

A transmission of information from a secondary to a primary node occurs in a plurality of N logical time durations. The transmission from the secondary to primary node in a wireless network is obtained using a first and a second sequence. Embodiments of the present invention mitigate interference by restricting the choice of the first sequence. Thus, in an embodiment of the invention, the first sequence is selected from a set of M sequences wherein M is strictly less than N. In order to accommodate high-velocity users, the restricted set contains a pair of sequences whose element-wise product is mirror symmetric. In other embodiments of the invention, the choices of the first sequence and second sequence in a time-frequency resource is arranged such that interference is mitigated. A transmission component for K-th logical time duration is obtained from the entire second sequence and K-th element of the first sequence.

24 Claims, 8 Drawing Sheets

SELECTION OF ORTHOGONAL COVERING SEQUENCES AND PHASE RAMPED SEQUENCES

CLAIM OF PRIORITY UNDER 35 U.S.C. 119(e)

The present application claims priority to and incorporates by reference U.S. Provisional Application No. 60/945,480, filed Jun. 21, 2007, entitled "Cyclic Shifts and Block Spreading Codes Allocation for Uplink ACK/NAK Transmissions with High Speed UEs." The present application also claims priority to and incorporates by reference U.S. Provisional Application No. 60/969,200, filed Aug. 31, 2007, entitled "Cyclic Shifts and Block Spreading Codes Allocation for Uplink ACK/NAK Transmissions with High Speed UEs."

FIELD OF THE INVENTION

This invention generally relates to wireless cellular communication, and in particular to use of block spreading codes in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Orthogonal block spreading codes can be applied to multiple users for simultaneous transmission within the same frequency-time resource. In case the user is traveling at a high velocity, its channel varies within the time period when block spreading is applied. Consequently, orthogonality between multiple users' signal is lost, resulting in inter-user interference which degrades the signal detection performance. On the other side, the user's channel typically evolves in a linear (or close to linear) fashion within the block spreading time period. For any set of orthogonal block spreading codes, there could be one or a few codes which do not cause significant inter-user interference. A method to arrange the block spreading codes in one time-frequency resource is described herein, such that inter-user interference is minimized. More importantly, it is critical to identify a restricted subset of all available block spreading codes such that each block spreading code in the restricted subset generates little interference and therefore can be randomly or implicitly assigned to UE of any velocity. Consequently, the signaling overhead of indicating block spreading code to UE can be reduced.

In this disclosure, block spreading code is sometimes denoted as orthogonal sequences, orthogonal covering, or any other equivalent term. The restricted subset is sometimes denoted as restrict set.

Figure 1:
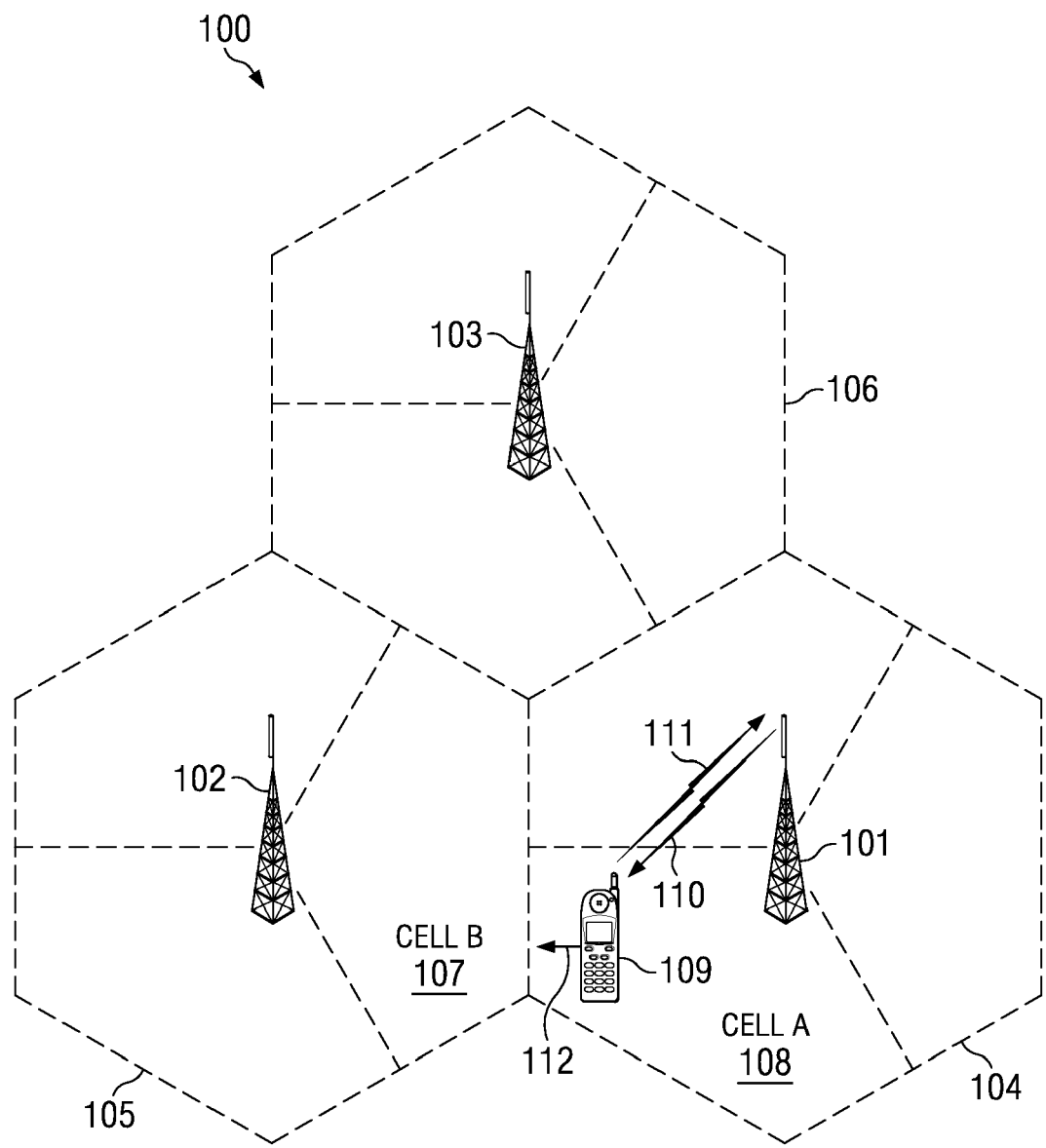
FIG. 1 is a pictorial of an illustrative telecommunications network that employs block spreading sequences.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

A UE in a cell may be stationary such as within a home or office, or may be moving while a user is walking or riding in a vehicle. UE 109 moves within cell 108 with a velocity 112 relative to base station 102.

Figure 2A:
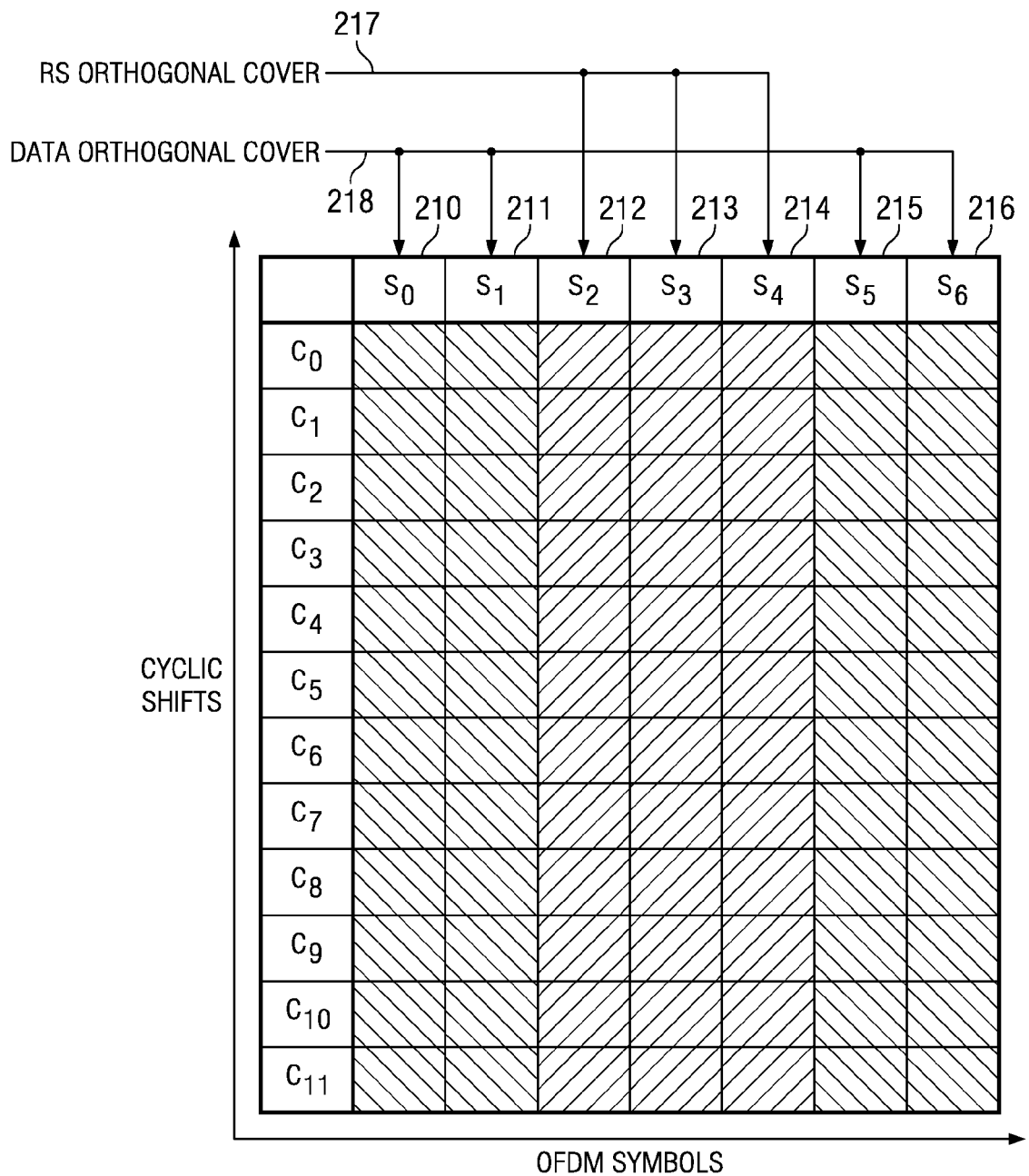
FIGS. 2A and 2B illustrate coherent orthogonal structures that support transmission by multiple users within the same frequency and time resource.
Figure 2B:
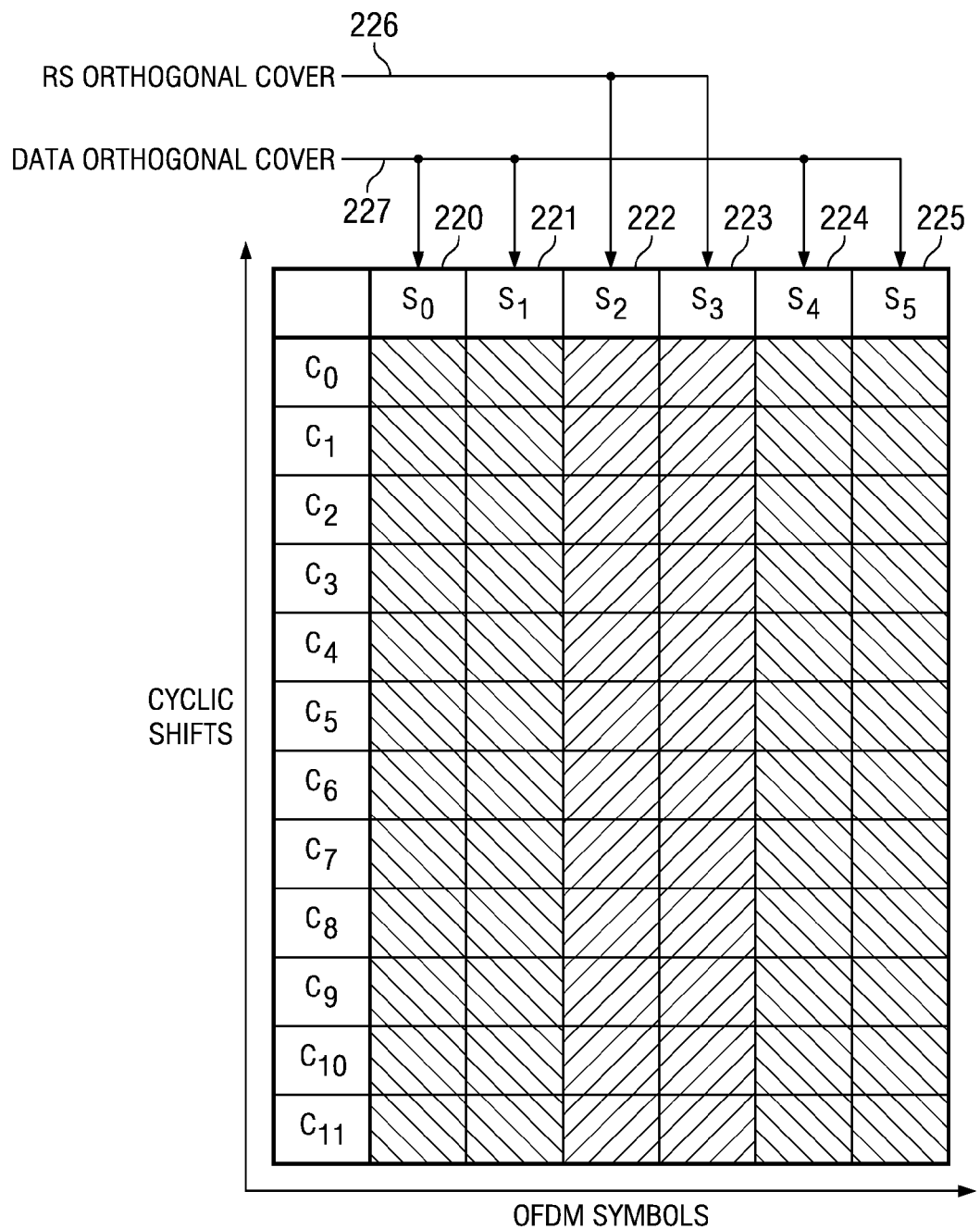

FIGS. 2A and 2B illustrate coherent orthogonal structures that support transmission by multiple users within the same frequency and time resource. A similar structure is specified in E-UTRA specifications for standalone ACK/NACK or SRI transmission on PUCCH. FIG. 2A illustrates one slot of a transmission frame in which normal cyclic prefix (CP) are used, where $c_0$-$c_{11}$ represent the cyclic shifts of a CAZAC-like sequence, and $S_0$-$S_6$ represent seven OFDM symbols per slot (0.5 ms). Without loss of generality, the middle three OFDM symbols 212-214 are assumed to carry the reference signal (RS) for coherence demodulation, while the other four OFDM symbols 210, 211, 215 and 216 carry the data information. Orthogonal covering 217 and 218 is applied to the RS OFDM symbols and the data bearing OFDM symbols, respectively. The data bearing OFDM symbols can be binary phase shift keying (BPSK) modulated, quadrature phase shift keying (QPSK) modulated, or ON-OFF keying modulated.

Similarly, FIG. 2B illustrates one slot of a transmission frame in which extended cyclic prefix (CP) are used and therefore only six symbols 220-225 are available per slot (0.5 ms). The middle two OFDM symbols 222-223 are assumed to carry the reference signal (RS) for coherence demodulation, while the other four OFDM symbols 220, 221, 224 and 225 carry the data information. Orthogonal covering 226 and 227 is applied to the RS OFDM symbols and the data bearing OFDM symbols, respectively. The data bearing OFDM symbols are BPSK modulated, QPSK modulated, or ON-OFF keying modulated.

In each OFDM symbol, a cyclically shifted or phase ramped CAZAC-like sequence is transmitted. The CAZAC-like sequence in a RS OFDM symbol is un-modulated. The CAZAC-like sequence in a data OFDM symbol is modulated by the data symbol. Here the data symbol can be the ACK/NAK symbol, SRI symbol, Rank Indicator (RI) symbol, or CQI symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \quad 0 \leq n \leq M_{sc}^{RS} - 1$$

where $M_{sc}^{RS} = 12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term. In other places, the CAZAC-like sequence is generally referred to as the second sequence, while the block spreading code is generally referred to as the first sequence.

TABLE 1

Definition of $\phi(n)$

| u | $\phi(0), \ldots, \phi(11)$ | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 1  | 1  | -3 | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 1  | -3 | 1  | -3 | -3 | -1 | -1 | 1  | -3 |
| 19 | -1 | 3  | 1  | 3  | 1  | -1 | -1 | 3  | -3 | -1 | -3 | -1 |

TABLE 1-continued

Definition of φ(n)

| u | φ(0), ..., φ(11) | | | | | | | | | | | |
|---|---|---|---|---|---|---|---|---|---|---|---|---|
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Block Spreading Codes

Figure 3:
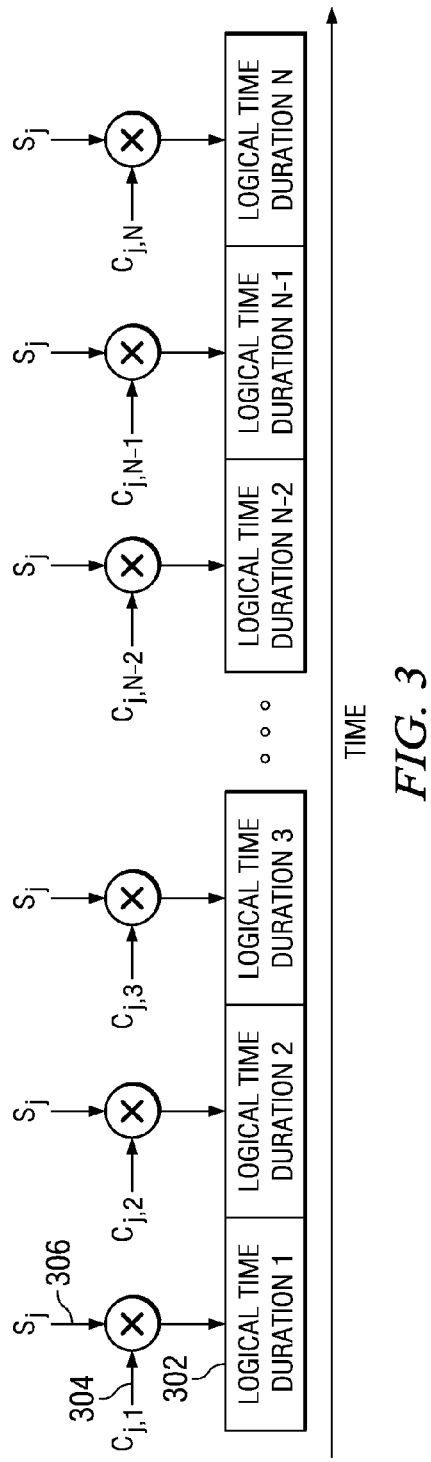
FIG. 3 is a diagram illustrating application of a block spreading code over a time frame.

In this disclosure, it is assumed that a block spreading code of length N is applied to N time slots. The N time slots can be consecutive or non-consecutive in time. Further, each of the time slots consists of one or multiple signal samples. FIG. 3 shows an example of a block spreading system over N time durations 302. $[c_{j,1}, c_{j,2}, \ldots, c_{j,N}]$ is the jth block spreading code, indicated in general as 304, which spreads the signal $S_j$, indicated in general as 306. If $S_j$ contains multiple signal samples, each signal sample is multiplied by block spreading symbol $c_{j,n}$ in the nth time duration, where $1 \leq n \leq N$.

In one embodiment, a restricted subset of block spreading codes having lower inter-user interference is selected from the set of block spread codes. A block spreading code in the restricted subset of block spreading codes is assigned to UE of any velocity. The block spreading codes in the selected subset of block spreading codes may be explicitly or implicitly assigned to UEs multiplexed in the same frequency-time resource for the transmission of ACK/NAK and SRI, as will be described in more detail below.

In one embodiment of this invention, the restricted subset of block spreading codes comprises three out of four length-4 Hadamard sequences. For example, the restricted subset of block spreading codes can be {[1 1 1 1], [1 −1 1 −1], [1 −1 −1 1]}, {[1 1 1 1], [1 1 −1 −1], [1 −1 −1 1]}, {[1 1 −1 −1], [1 1 1 −1], [1 −1 1 −1]}, or {[1 1 −1 −1], [1 −1 −1 1], [1 −1 1 −1]}. In another embodiment of the invention, the restricted subset of block spreading codes comprises two out of the four length-3 Hadamard sequences, e.g. {[1 1 1 1], [1 −1 −1 1]} or {[1 1 −1 −1], [1 −1 1 −1]}.

A property of the restricted subset of block spreading codes is that element-wise product of at least a pair of orthogonal sequences in the restricted subset is mirror symmetric. For example, in the restricted subset of orthogonal sequences of [1 1 1 1], [1 1 −1 −1], [1 −1 −1 1]), the element-wise produce of [1 1 1 1] and [1 −1 −1 1] is [1 −1 −1 1], which is mirror symmetric. Another example of restricted subset is {[1 1 −1 −1], [1 −1 1 −1]}, with the element-wise product of the two orthogonal sequences as [1 −1 −1 1], which is also mirror symmetric.

The property of mirror symmetry of the element-wise product of two orthogonal sequences are essential for reducing interference, as the channel variation is linear or quasi-linear over the time duration where block spreading is applied.

Unlink ACK/NAK Structures

Figure 4:
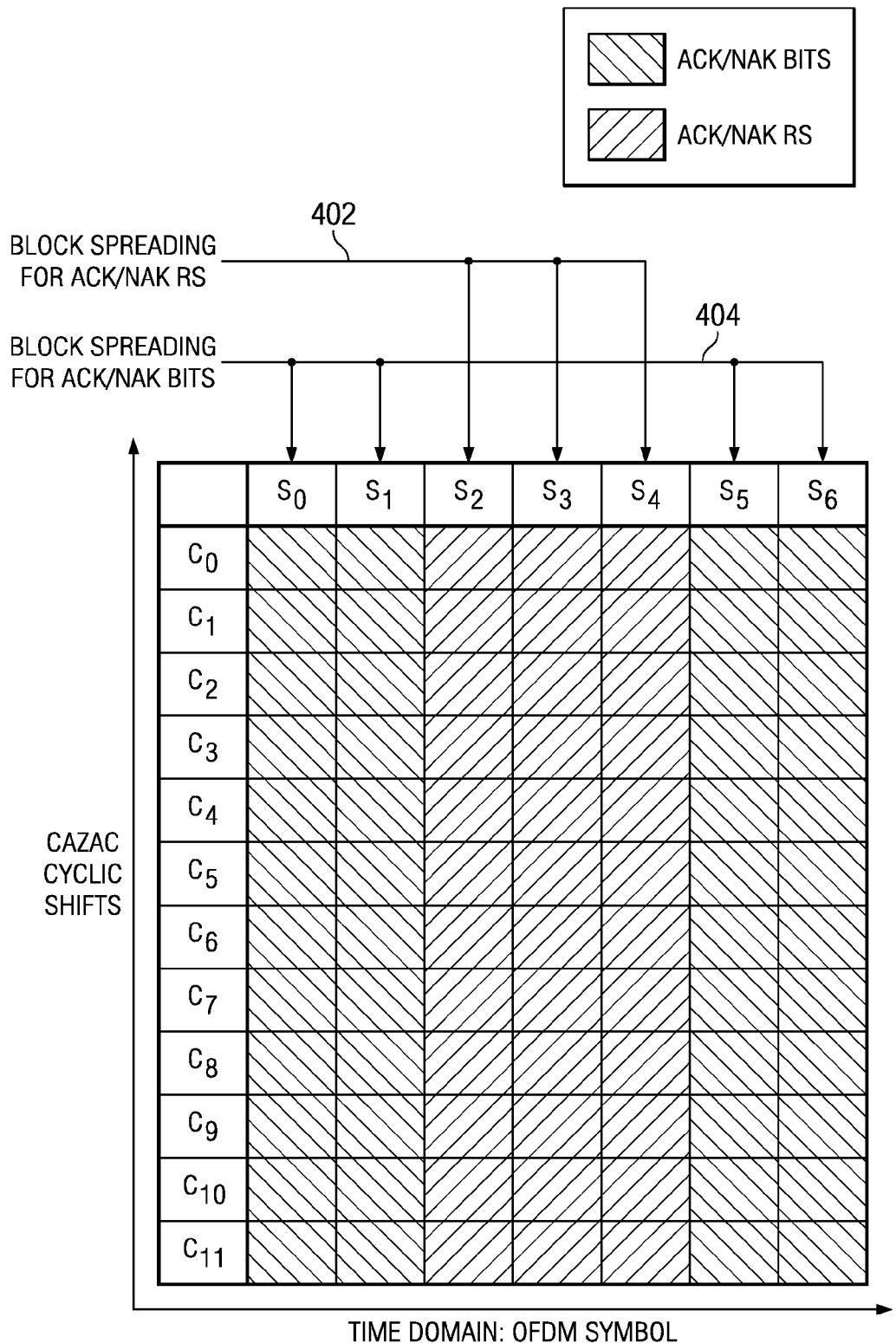
FIG. 4 is an illustration of transmission of ACK/NAK symbols using the orthogonal structure of FIG. 2A.

Coherent transmission with three RS OFDM symbols per slot may be used for uplink ACK/NAK transmission corresponding to scheduled downlink data service in one embodiment. In other embodiments, fewer or more RS symbols by be used. FIG. 4 shows a block diagram illustrating a coherent ACK/NAK transmission scheme per slot, where CS0-CS11 represent 12 cyclic shifts per resource block (RB) and S0-S6 denote seven OFDM symbols per slot. Although the exact RS symbol positions may vary from one embodiment to another, without loss of generality, an illustrative example can assume RS is transmitted in the 3rd, 4th, and 5th OFDM symbols, S2, S3 and S4.

In another embodiment, CS0-CS11 represent 12 different amounts of phase ramp applied to a root CAZAC-like sequence. A cyclic shifted sequence is obtained by a cyclic shift operation on the root sequence, which is typically defined in the time domain. Phase ramped sequence is obtained by a phase ramp operation on the root sequences, which is typically defined in the frequency domain. The proposed method in this disclosure applies to both cyclic shifted sequences and phase ramped sequences.

To increase the ACK/NAK multiplexing capacity, block spreading is applied to the RS OFDM symbols and ACK/NAK bearing OFDM symbols, respectively. For example, the RS OFDM symbols are covered by block spreading codes 402 of length three, while the ACK/NAK bearing OFDM symbols are covered with block spreading codes 404 of length four.

In order to mitigate the loss of orthogonality between block spreading codes with high speed UEs, a set of rules is proposed for arranging the block spreading codes and cyclic shift (or phase ramp) of a CAZAC-like sequence in a time-frequency resource. Without loss of generality, denote the block spreading codes for the 4 ACK/NAK bearing OFDM symbols as:

ACK BS 1=[1 1 1 1];
ACK BS 2=[1 −1 −1 1];
ACK BS 3=[1 1 −1 −1];
ACK BS 4=[1 −1 1 −1];

The following four rules for UL ACK/NAK resource (cyclic shifts and block spreading codes) allocation are then employed to arrange the block spreading codes and cyclic shifted (or phase ramped) sequences.

1) For any cyclic shift (or phase ramp), no more than two UEs can be multiplexed on the same cyclic shift (or phase ramp) though different block spreading codes. This rule applies to ACK/NAK bearing OFDM symbols, as well as RS OFDM symbols.

2) For any cyclic shift (or phase ramp) where two UEs are multiplexed on it, either {[1 1 1 1], [1 −1 −1 1]} or {[1 1 −1 −1], [1 −1 1 −1]} should be used as the block spreading codes for the ACK/NAK bearing OFDM symbols.

3) For any two consecutive cyclic shifts (e.g. $[c_0 \, c_1]$, $[c_1 \, c_2], \ldots, [c_{10} \, c_{11}], [c_{11} \, c_0]$), each block spreading code can only be assigned to one UE. This applies to both ACK/NAK block spreading codes and reference signal (RS) block spreading codes.

4) For ACK BS1, it should be separated from ACK/NAK BS 3 as far as possible in the cyclic shift domain. For ACK BS 2, it should be separated from ACK/NAK BS 4 as far as possible in the cyclic shift domain. These two restrictions may be applicable simultaneously if all four ACK BS sequences are used.

In essence, if two UEs are multiplexed on the same cyclic shift, the block spreading codes assigned to these two UEs comprise the pair of block spreading codes, whose element-wise product is mirror symmetric. This reduces the inter-user interference.

In addition, if two UEs are assigned with a common block spreading code, their assigned cyclic shifts are separated by at least one guard cyclic shift, which is not assigned to any UE. This reduces the interference from neighboring cyclic shift.

Following the above four rules, some examples of the uplink ACK/NAK resource allocation are given in Tables 2-9. Notice that a Node-B can dynamically switch between different valid UL ACK/NAK resource allocation schemes or the UL ACK/NAK resource allocations can hop periodically. Furthermore, different ACK/NAK resource (channel) allocation can be planned in different NodeBs/cells. For example, cell 1 uses the ACK/NAK resource allocation in Table 2; cell 2 uses the ACK/NAK resource allocation in Table 3; cell 3 uses the ACK/NAK resource allocation in Table 4, and so on.

In case of ACK/NAK resource allocation hopping within a cell, the hopping pattern can be cell specific, NodeB specific, or common to a subset/all cells in the system.

TABLE 1

UL ACK/NAK Resource Allocation 1

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | UE1 | UE7 | | UE1 | UE7 | | |
| $C_1$ | | | UE13 | | | UE13 | |
| $C_2$ | UE2 | UE8 | | UE2 | UE8 | | |
| $C_3$ | | | UE14 | | | UE14 | |
| $C_4$ | UE3 | UE9 | | UE3 | UE9 | | |
| $C_5$ | | | UE15 | | | UE15 | |
| $C_6$ | UE4 | UE10 | | UE4 | UE10 | | |
| $C_7$ | | | UE16 | | | UE16 | |
| $C_8$ | UE5 | UE11 | | UE5 | UE11 | | |
| $C_9$ | | | UE17 | | | UE17 | |
| $C_{10}$ | UE6 | UE12 | | UE6 | UE12 | | |
| $C_{11}$ | | | UE18 | | | UE18 | |

TABLE 2

UL ACK/NAK Resource Allocation 2

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | UE1 | UE7 | | UE1 | UE7 | | |
| $C_1$ | | | UE13 | | | | UE13 |
| $C_2$ | UE2 | UE8 | | UE2 | UE8 | | |
| $C_3$ | | | UE14 | | | | UE14 |
| $C_4$ | UE3 | UE9 | | UE3 | UE9 | | |
| $C_5$ | | | UE15 | | | | UE15 |
| $C_6$ | UE4 | UE10 | | UE4 | UE10 | | |
| $C_7$ | | | UE16 | | | | UE16 |
| $C_8$ | UE5 | UE11 | | UE5 | UE11 | | |
| $C_9$ | | | UE17 | | | | UE17 |
| $C_{10}$ | UE6 | UE12 | | UE6 | UE12 | | |
| $C_{11}$ | | | UE18 | | | | UE18 |

TABLE 3

UL ACK/NAK Resource Allocation 3

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | UE1 | UE7 | | | | UE1 | UE7 |
| $C_1$ | | | UE13 | UE13 | | | |
| $C_2$ | UE2 | UE8 | | | | UE2 | UE8 |
| $C_3$ | | | UE14 | UE14 | | | |
| $C_4$ | UE3 | UE9 | | | | UE3 | UE9 |
| $C_5$ | | | UE15 | UE15 | | | |
| $C_6$ | UE4 | UE10 | | | | UE4 | UE10 |
| $C_7$ | | | UE16 | UE16 | | | |
| $C_8$ | UE5 | UE11 | | | | UE5 | UE11 |
| $C_9$ | | | UE17 | UE17 | | | |
| $C_{10}$ | UE6 | UE12 | | | | UE6 | UE12 |
| $C_{11}$ | | | UE18 | UE18 | | | |

TABLE 4

UL ACK/NAK Resource Allocation 4

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | UE1 | UE7 | | | | UE1 | UE7 |
| $C_1$ | | | | UE13 | UE13 | | |
| $C_2$ | UE2 | UE8 | | | | UE2 | UE8 |
| $C_3$ | | | | UE14 | UE14 | | |
| $C_4$ | UE3 | UE9 | | | | UE3 | UE9 |
| $C_5$ | | | | UE15 | UE15 | | |
| $C_6$ | UE4 | UE10 | | | | UE4 | UE10 |
| $C_7$ | | | | UE16 | UE16 | | |

TABLE 4-continued

| | UL ACK/NAK Resource Allocation 4 | | | | | | |
|---|---|---|---|---|---|---|---|
| | RS BS 1 | RS BS 2 | RS BS 3 | ACK BS 1 | ACK BS 2 | ACK BS 3 | ACK BS 4 |
| $C_8$ | UE5 | UE11 | | | | UE5 | UE11 |
| $C_9$ | | | UE17 | | UE17 | | |
| $C_{10}$ | UE6 | UE12 | | | | UE6 | UE12 |
| $C_{11}$ | | | UE18 | | UE18 | | |

TABLE 5

| | UL ACK/NAK Resource Allocation 5 | | | | | | |
|---|---|---|---|---|---|---|---|
| | RS BS 1 | RS BS 2 | RS BS 3 | ACK BS 1 | ACK BS 2 | ACK BS 3 | ACK BS 4 |
| $C_0$ | UE1 | UE7 | | | | UE1 | UE7 |
| $C_1$ | | | UE13 | UE13 | | | |
| $C_2$ | UE2 | UE8 | | | | UE2 | UE8 |
| $C_3$ | | | UE14 | | UE14 | | |
| $C_4$ | UE3 | UE9 | | | | UE3 | UE9 |
| $C_5$ | | | UE15 | UE15 | | | |
| $C_6$ | UE4 | UE10 | | | | UE4 | UE10 |
| $C_7$ | | | UE16 | | UE16 | | |
| $C_8$ | UE5 | UE11 | | | | UE5 | UE11 |
| $C_9$ | | | UE17 | UE17 | | | |
| $C_{10}$ | UE6 | UE12 | | | | UE6 | UE12 |
| $C_{11}$ | | | UE18 | | UE18 | | |

TABLE 6

| | UL ACK/NAK Resource Allocation 6 | | | | | | |
|---|---|---|---|---|---|---|---|
| | RS BS 1 | RS BS 2 | RS BS 3 | ACK BS 1 | ACK BS 2 | ACK BS 3 | ACK BS 4 |
| $C_0$ | UE1 | UE7 | | UE1 | UE7 | | |
| $C_1$ | | | UE13 | | | UE13 | |
| $C_2$ | UE2 | UE8 | | UE2 | UE8 | | |
| $C_3$ | | | UE14 | | | | UE14 |
| $C_4$ | UE3 | UE9 | | UE3 | UE9 | | |
| $C_5$ | | | UE15 | | | UE15 | |
| $C_6$ | UE4 | UE10 | | UE4 | UE10 | | |
| $C_7$ | | | UE16 | | | | UE16 |
| $C_8$ | UE5 | UE11 | | UE5 | UE11 | | |
| $C_9$ | | | UE17 | | | UE17 | |
| $C_{10}$ | UE6 | UE12 | | UE6 | UE12 | | |
| $C_{11}$ | | | UE18 | | | | UE18 |

TABLE 7

| | UL ACK/NAK Resource Allocation 7 | | | | | | |
|---|---|---|---|---|---|---|---|
| | RS BS 1 | RS BS 2 | RS BS 3 | ACK BS 1 | ACK BS 2 | ACK BS 3 | ACK BS 4 |
| $C_0$ | UE1 | UE7 | | UE1 | UE7 | | |
| $C_1$ | | | UE13 | | | | UE13 |
| $C_2$ | UE2 | UE8 | | UE2 | UE8 | | |
| $C_3$ | | | UE14 | | | UE14 | |
| $C_4$ | UE3 | UE9 | | UE3 | UE9 | | |
| $C_5$ | | | UE15 | | | | UE15 |
| $C_6$ | UE4 | UE10 | | UE4 | UE10 | | |
| $C_7$ | | | UE16 | | | UE16 | |
| $C_8$ | UE5 | UE11 | | UE5 | UE11 | | |
| $C_9$ | | | UE17 | | | | UE17 |
| $C_{10}$ | UE6 | UE12 | | UE6 | UE12 | | |
| $C_{11}$ | | | UE18 | | | UE18 | |

TABLE 8

UL ACK/NAK Resource Allocation 8

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | UE1 | UE7 | | | | UE1 | UE7 |
| $C_1$ | | | UE13 | | UE13 | | |
| $C_2$ | UE2 | UE8 | | | | UE2 | UE8 |
| $C_3$ | | | UE14 | UE14 | | | |
| $C_4$ | UE3 | UE9 | | | | UE3 | UE9 |
| $C_5$ | | | UE15 | | UE15 | | |
| $C_6$ | UE4 | UE10 | | | | UE4 | UE10 |
| $C_7$ | | | UE16 | UE16 | | | |
| $C_8$ | UE5 | UE11 | | | | UE5 | UE11 |
| $C_9$ | | | UE17 | | UE17 | | |
| $C_{10}$ | UE6 | UE12 | | | | UE6 | UE12 |
| $C_{11}$ | | | UE18 | UE18 | | | |

In order for a UE to determine the ACK/NAK resource (i.e. cyclic shift index and block spreading code index), the following two approaches can be adopted.

In the first approach, NodeB sends a DL grant on DL control channel (i.e PDCCH in 3GPP LTE) to a UE. The DL grant is transmitted on control channel element with index L. UE detects its DL grant, and uses the control channel element index L to derive the ACK/NAK resource. This approach is typically applied to dynamically scheduled traffic.

In the second approach, NodeB explicitly sends an ACK/NAK resource index L to a UE. UE receives the index L and determines the ACK/NAK resource using the received index L. NodeB typically explicitly sends the ACK/NAK resource index L on DL share data channel (i.e. PDSCH in 3GPP LTE). This approach is applied commonly to persistent traffic.

Without loss of generality, denote f(L) as the index of the block spreading sequence, and s(L) as the amount of cyclic shift or phase ramp applied to the root CAZAC-like sequence. Tables 10-11 show two exemplary arrangements of block spreading codes and cyclic shift (or phase ramp) of a root CAZAC-like sequence in a time-frequency resource for ACK/NAK.

TABLE 10

Exemplary arrangement of block spreading codes and cyclic shift

| Cyclic shift or Phase ramp | Block Spreading codes for Data OFDM symbols | | | Block Spreading codes for RS OFDM symbols | | |
|---|---|---|---|---|---|---|
| | [1 1 1 1] | [1 −1 1 −1] | [1 −1 −1 1] | [1 1 1] | [1 $e^{j2\pi/3}$ $e^{j4\pi/3}$] | [1 $e^{j4\pi/3}$ $e^{j2\pi/3}$] |
| 0 | f(L1), s(L1) | | f(L13), s(L13) | f(L1), s(L1) | | f(L13), s(L13) |
| 1 | | f(L7), s(L7) | | | f(L7), s(L7) | |
| 2 | f(L2), s(L2) | | f(L14), s(L14) | f(L2), s(L2) | | f(L14), s(L14) |
| 3 | | f(L8), s(L8) | | | f(L8), s(L8) | |
| 4 | f(L3), s(L3) | | f(L15), s(L15) | f(L3), s(L3) | | f(L15), s(L15) |
| 5 | | f(L9), s(L9) | | | f(L9), s(L9) | |
| 6 | f(L4), s(L4) | | f(L16), s(L16) | f(L4), s(L4) | | f(L16), s(L16) |
| 7 | | f(L10), s(L10) | | | f(L10), s(L10) | |
| 8 | f(L5), s(L5) | | f(L17), s(L17) | f(L5), s(L5) | | f(L17), s(L17) |
| 9 | | f(L11), s(L11) | | | f(L11), s(L11) | |
| 10 | f(L6), s(L6) | | f(L18), s(L18) | f(L6), s(L6) | | f(L18), s(L18) |
| 11 | | f(L12), s(L12) | | | f(L12), s(L12) | |

TABLE 11

Exemplary arrangement of block spreading codes and cyclic shift

| Cyclic shift or Phase ramp | Block Spreading codes for Data OFDM symbols | | | Block Spreading codes for RS OFDM symbols | | |
|---|---|---|---|---|---|---|
| | [1 1 1 1] | [1 −1 1 −1] | [1 −1 −1 1] | [1 1 1] | [1 $e^{j2\pi/3}$ $e^{j4\pi/3}$] | [1 $e^{j4\pi/3}$ $e^{j2\pi/3}$] |
| 1 | f(L1), s(L1) | | f(L13), s(L13) | f(L1), s(L1) | | f(L13), s(L13) |
| 2 | | f(L7), s(L7) | | | f(L7), s(L7) | |
| 3 | f(L2), s(L2) | | f(L14), s(L14) | f(L2), s(L2) | | f(L14), s(L14) |
| 4 | | f(L8), s(L8) | | | f(L8), s(L8) | |
| 5 | f(L3), s(L3) | | f(L15), s(L15) | f(L3), s(L3) | | f(L15), s(L15) |
| 6 | | f(L9), s(L9) | | | f(L9), s(L9) | |
| 7 | f(L4), s(L4) | | f(L16), s(L16) | f(L4), s(L4) | | f(L16), s(L16) |
| 8 | | f(L10), s(L10) | | | f(L10), s(L10) | |
| 9 | f(L5), s(L5) | | f(L17), s(L17) | f(L5), s(L5) | | f(L17), s(L17) |

TABLE 11-continued

Exemplary arrangement of block spreading codes and cyclic shift

| Cyclic shift or Phase | Block Spreading codes for Data OFDM symbols | | | | Block Spreading codes for RS OFDM symbols | |
|---|---|---|---|---|---|---|
| ramp | [1 1 1 1] | [1 -1 1 -1] | [1 -1 -1 1] | [1 1 1] | [1 $e^{j2\pi/3}$ $e^{j4\pi/3}$] | [1 $e^{j4\pi/3}$ $e^{j2\pi/3}$] |
| 10 | | f(L11), s(L11) | | | f(L11), s(L11) | |
| 11 | f(L6), s(L6) | | f(L18), s(L18) | f(L6), s(L6) | | f(L18), s(L18) |
| 0 | | f(L12), s(L12) | | | f(L12), s(L12) | |

In Table 10, for the data OFDM symbols, assuming index L belongs to a set comprising from L1, L2, L3, L4, L5, L6, L7, L8, L8, L9, L10, L11, L12, L13, L14, L15, L16, L17, L18, wherein f(L1), f(L2), f(L3), f(L4), f(L5), f(L6) map to the index of the block spreading code [1 1 1 1], wherein f(L7), f(L8), f(L9), f(L10), f(L11), f(L12) map to the index of the block spreading code [1 -1 1 -1], wherein f(L13), f(L14), f(L15), f(L16), f(L17), f(L18) map to the index of the block spreading code [1 -1 -1 1], wherein s(L1)=s(L13)=0, s(L2)=s(L14)=2, s(L3)=s(L15)=4, s(L4)=s(L16)=6, s(L5)=s(L17)=8, s(L6)=s(L18)=10, s(L7)=1, s(L8)=3, s(L9)=5, s(L10)=7, s(L11)=9, s(L12)=11.

In Table 10, for the RS OFDM symbols, f(L1), f(L2), f(L3), f(L4), f(L5), f(L6) map to the index of the block spreading code [1 1 1], wherein f(L7), f(L8), f(L9), f(L10), f(L11), f(L12) map to the index of the block spreading code [1 $e^{j2\pi/3}$ $e^{j4\pi/3}$], wherein f(L13), f(L14), f(L15), f(L16), f(L17), f(L18) map to the index of the block spreading code [1 $e^{j4\pi/3}$ $e^{j2\pi/3}$], wherein s(L1)=s(L13)=0, s(L2)=s(L14)=2, s(L3)=s(L15)=4, s(L4)=s(L16)=6, s(L5)=s(L17)=8, s(L6)=s(L18)=10, s(L7)=1, s(L8)=3, s(L9)=5, s(L10)=7, s(L11)=9, s(L12)=11.

In Table 11, for the data OFDM symbols, assuming index L belongs to a set comprising from L1, L2, L3, L4, L5, L6, L7, L8, L8, L9, L10, L11, L12, L13, L14, L15, L16, L17, L18, wherein f(L1), f(L2), f(L3), f(L4), f(L5), f(L6) map to the index of the block spreading code [1 1 1 1], wherein f(L7), f(L8), f(L9), f(L10), f(L11), f(L12) map to the index of the block spreading code [1 -1 1 -1], wherein f(L13), f(L14), f(L15), f(L16), f(L17), f(L18) map to the index of the block spreading code [1 -1 -1], wherein s(L1)=s(L13)=1, s(L2)=s(L14)=3, s(L3)=s(L15)=5, s(L4)=s(L16)=7, s(L5)=s(L17)=9, s(L6)=s(L18)=11, s(L7)=2, s(L8)=4, s(L9)=6, s(L10)=8, s(L11)=10, s(L12)=0.

In Table 11, for the RS OFDM symbols, f(L1), f(L2), f(L3), f(L4), f(L5), f(L6) map to the index of the block spreading code [1 1 1], wherein f(L7), f(L8), f(L9), f(L10), f(L11), f(L12) map to the index of the block spreading code [1 $e^{j2\pi/3}$ $e^{j4\pi/3}$], wherein f(L13), f(L14), f(L15), f(L16), f(L17), f(L18) map to the index of the block spreading code [1 $e^{j4\pi/3}$ $e^{j2\pi/3}$], wherein s(L1)=s(L13)=1, s(L2)=s(L14)=3, s(L3)=s(L15)=5, s(L4)=s(L16)=7, s(L5)=s(L17)=9, s(L6)=s(L18)=11, s(L7)=2, s(L8)=4, s(L9)=6, s(L10)=8, s(L11)=10, s(L12)=0.

The examples in Tables 10-11 can be applied to ACK/NAK corresponding to dynamically scheduled packets and ACK/NAK corresponding to persistently scheduled packets. The examples in Tables 10-11 can be applied to the transmission of scheduling request indicator (SRI).

In case CQI is also transmitted in the same resource block of UL ACK/NAK, at least one cyclic shift between the CQI and ACK/NAK should be reserved, to reduce the interference due to spillover between cyclic shifts of a CAZAC sequence. Some examples are shown in Tables 12-18. Further, it is possible for CQI UEs to occupy a few cyclic shifts in the middle. An example is shown in Table 13. In other words, the cyclic shift indices should be treated as rotational invariant for UL ACK/NAK and CQI resource allocation. Moreover, only one consecutive section of cyclic shifts (including the reserved cyclic shifts) is assigned for CQI UEs. Moreover, at least one cyclic shift at each edge of the CQI cyclic shift section is reserved. Block spreading is not applied to CQI transmissions. In other words, only the cyclic shifted root sequence is indicated to a UE for its CQI transmissions.

TABLE 12

Resource Allocation 1 for UL ACK/NAK + CQI

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | ACK UE1 | ACK UE6 | | ACK UE1 | ACK UE6 | | |
| $C_1$ | | | ACK UE11 | | | | ACK UE11 |
| $C_2$ | ACK UE2 | ACK UE7 | | ACK UE2 | ACK UE7 | | |
| $C_3$ | | | ACK UE12 | | | | ACK UE12 |
| $C_4$ | ACK UE3 | ACK UE8 | | ACK UE3 | ACK UE8 | | |
| $C_5$ | | | ACK UE13 | | | | ACK UE13 |
| $C_6$ | ACK UE4 | ACK UE9 | | ACK UE4 | ACK UE9 | | |
| $C_7$ | | | ACK UE14 | | | | ACK UE14 |
| $C_8$ | ACK UE5 | ACK UE10 | | ACK UE5 | ACK UE10 | | |
| $C_9$ | | | | | Reserved | | |
| $C_{10}$ | | | | | CQI UE 1 | | |
| $C_{11}$ | | | | | Reserved | | |

OFDM Symbols for CQI UEs →

TABLE 13

Resource Allocation 2 for UL ACK/NAK + CQI

|          | RS BS 1  | RS BS 2  | RS BS 3  | ACK BS 1 | ACK BS 2 | ACK BS 3 | ACK BS 4 |
|----------|----------|----------|----------|----------|----------|----------|----------|
| $C_0$    | ACK UE1  | ACK UE5  |          | ACK UE1  | ACK UE5  |          |          |
| $C_1$    |          |          | ACK UE9  |          |          |          | ACK UE9  |
| $C_2$    | ACK UE2  | ACK UE6  |          | ACK UE2  | ACK UE6  |          |          |
| $C_3$    |          |          | ACK UE10 |          |          |          | ACK UE10 |
| $C_4$    | ACK UE3  | ACK UE7  |          | ACK UE3  | ACK UE7  |          |          |
| $C_5$    |          |          | ACK UE11 |          |          |          | ACK UE11 |
| $C_6$    | ACK UE4  | ACK UE8  |          | ACK UE4  | ACK UE8  |          |          |
| $C_7$    |          |          |          | Reserved |          |          |          |
| $C_8$    |          |          |          | CQI UE 1 |          |          |          |
| $C_9$    |          |          |          | Reserved |          |          |          |
| $C_{10}$ |          |          |          | CQI UE 2 |          |          |          |
| $C_{11}$ |          |          |          | Reserved |          |          |          |

——————————————————————————————————————————→
OFDM Symbols for CQI UEs

TABLE 14

Resource Allocation 3 for UL ACK/NAK + CQI

|          | RS BS 1  | RS BS 2  | RS BS 3  | ACK BS 1 | ACK BS 2 | ACK BS 3 | ACK BS 4 |
|----------|----------|----------|----------|----------|----------|----------|----------|
| $C_0$    | ACK UE1  | ACK UE4  |          | ACK UE1  | ACK UE4  |          |          |
| $C_1$    |          |          | ACK UE7  |          |          |          | ACK UE7  |
| $C_2$    | ACK UE2  | ACK UE5  |          | ACK UE2  | ACK UE5  |          |          |
| $C_3$    |          |          | ACK UE8  |          |          |          | ACK UE8  |
| $C_4$    | ACK UE3  | ACK UE6  |          | ACK UE3  | ACK UE6  |          |          |
| $C_5$    |          |          |          | Reserved |          |          |          |
| $C_6$    |          |          |          | CQI UE 1 |          |          |          |
| $C_7$    |          |          |          | Reserved |          |          |          |
| $C_8$    |          |          |          | CQI UE 2 |          |          |          |
| $C_9$    |          |          |          | Reserved |          |          |          |
| $C_{10}$ |          |          |          | CQI UE 3 |          |          |          |
| $C_{11}$ |          |          |          | Reserved |          |          |          |

——————————————————————————————————————————→
OFDM Symbols for CQI UEs

TABLE 15

Resource Allocation 4 for UL ACK/NAK + CQI

|          | RS BS 1  | RS BS 2  | RS BS 3  | ACK BS 1 | ACK BS 2 | ACK BS 3 | ACK BS 4 |
|----------|----------|----------|----------|----------|----------|----------|----------|
| $C_0$    | ACK UE1  | ACK UE3  |          | ACK UE1  | ACK UE3  |          |          |
| $C_1$    |          |          | ACK UE5  |          |          |          | ACK UE5  |
| $C_2$    | ACK UE2  | ACK UE4  |          | ACK UE2  | ACK UE4  |          |          |
| $C_3$    |          |          |          | Reserved |          |          |          |
| $C_4$    |          |          |          | CQI UE 1 |          |          |          |
| $C_5$    |          |          |          | Reserved |          |          |          |
| $C_6$    |          |          |          | CQI UE 2 |          |          |          |
| $C_7$    |          |          |          | Reserved |          |          |          |
| $C_8$    |          |          |          | CQI UE 3 |          |          |          |
| $C_9$    |          |          |          | Reserved |          |          |          |
| $C_{10}$ |          |          |          | CQI UE 4 |          |          |          |
| $C_{11}$ |          |          |          | Reserved |          |          |          |

——————————————————————————————————————————→
OFDM Symbols for CQI UEs

TABLE 9

Resource Allocation 5 for UL ACK/NAK + CQI

|          | RS BS 1  | RS BS 2  | RS BS 3  | ACK BS 1 | ACK BS 2 | ACK BS 3 | ACK BS 4 |
|----------|----------|----------|----------|----------|----------|----------|----------|
| $C_0$    | ACK UE1  | ACK UE2  |          | ACK UE1  | ACK UE2  |          |          |
| $C_1$    |          |          |          | Reserved |          |          |          |
| $C_2$    |          |          |          | CQI UE 1 |          |          |          |
| $C_3$    |          |          |          | Reserved |          |          |          |
| $C_4$    |          |          |          | CQI UE 2 |          |          |          |
| $C_5$    |          |          |          | Reserved |          |          |          |

TABLE 9-continued

Resource Allocation 5 for UL ACK/NAK + CQI

| | RS BS 1 | RS BS 2 | RS BS 3 | ACK BS 1 | ACK BS 2 | ACK BS 3 | ACK BS 4 |
|---|---|---|---|---|---|---|---|
| $C_6$ | | | | CQI UE 3 | | | |
| $C_7$ | | | | Reserved | | | |
| $C_8$ | | | | CQI UE 4 | | | |
| $C_9$ | | | | Reserved | | | |
| $C_{10}$ | | | | CQI UE 5 | | | |
| $C_{11}$ | | | | Reserved | | | |

OFDM Symbols for CQI UEs

TABLE 17

Resource Allocation for CQI only

| $C_0$ | CQI UE 1 |
|---|---|
| $C_1$ | Reserved |
| $C_2$ | CQI UE 2 |
| $C_3$ | Reserved |
| $C_4$ | CQI UE 3 |
| $C_5$ | Reserved |
| $C_6$ | CQI UE 4 |
| $C_7$ | Reserved |
| $C_8$ | CQI UE 5 |
| $C_9$ | Reserved |
| $C_{10}$ | CQI UE 6 |
| $C_{11}$ | Reserved |

OFDM Symbols for CQI UEs

TABLE 18

Resource Allocation for UL ACK/NAK + CQI

| | RS BS 1 | RS BS 2 | RS BS 3 | ACK BS 1 | ACK BS 2 | ACK BS 3 | ACK BS 4 |
|---|---|---|---|---|---|---|---|
| $C_0$ | ACK UE1 | ACK UE5 | | ACK UE1 | ACK UE5 | | |
| $C_1$ | | | ACK UE9 | | | | ACK UE9 |
| $C_2$ | ACK UE2 | ACK UE6 | | ACK UE2 | ACK UE6 | | |
| $C_3$ | | | ACK UE10 | | | | ACK UE10 |
| $C_4$ | | | | Reserved | | | |
| $C_5$ | | | | CQI UE 1 | | | |
| $C_6$ | | | | Reserved | | | |
| $C_7$ | | | | CQI UE 2 | | | |
| $C_8$ | | | | Reserved | | | |
| $C_9$ | ACK UE3 | ACK UE7 | | ACK UE3 | ACK UE7 | | |
| $C_{10}$ | | | ACK UE11 | | | | ACK UE11 |
| $C_{11}$ | ACK UE4 | ACK UE8 | | ACK UE4 | ACK UE8 | | |

OFDM Symbols for CQI UEs

Figure 5:
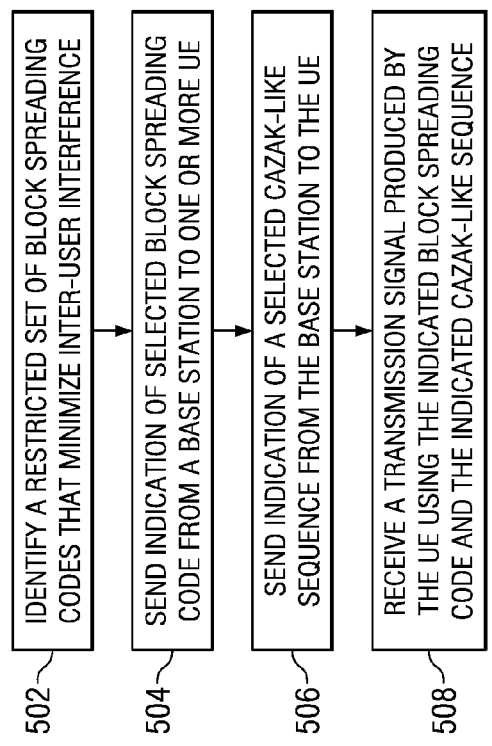
FIG. 5 is a flow diagram illustrating assignment of block spreading codes and CAZAK-like sequences according to an embodiment of the present invention.

FIG. 5 is a flow diagram illustrating assignment of block spreading codes and CAZAK-like sequences according to an embodiment of the present invention. As described above, orthogonal block spreading codes can be applied to multiple users for simultaneous transmission within the same frequency-time resource. A restricted set of block spreading codes is identified 502 as described above. In one embodiment, a restricted subset of block spreading codes having lower inter-user interference is selected from the set of block spread codes. A property of the restricted subset of block spreading codes is that element-wise product of at least a pair of orthogonal sequences in the restricted subset is mirror symmetric.

A block spreading code in the restricted subset of block spreading codes is assigned to UE of any velocity by sending 504 an indication of the selected code from the eNB to a UE. The block spreading codes in the selected subset of block spreading codes may be explicitly or implicitly assigned to UEs multiplexed in the same frequency-time resource for the transmission of ACK/NAK and SRI, as described above.

In this embodiment, a CAZAK-like sequence is used in the frequency-time resource. As described above, the root sequence may be cyclic shifted or phase ramped to form a set of sequences. The eNB sends 506 an indication of a sequence selected from the set of sequences to pair with block spreading code assigned to the UE the in accordance with the rules described above and Tables 2-18.

When the UE is ready to transmit, it forms a modulated transmission signal that is compatible with the coherent orthogonal structures illustrated in FIGS. 2A-2B, and 4. The indicated block spreading code assigned by the eNB is used with the selected CAZAK-like sequence indicated by the eNB using the block spreading operation illustrated in FIG. 3. This transmission signal is received 508 by the eNB serving the UE and demodulated by the eNB.

Figure 6:
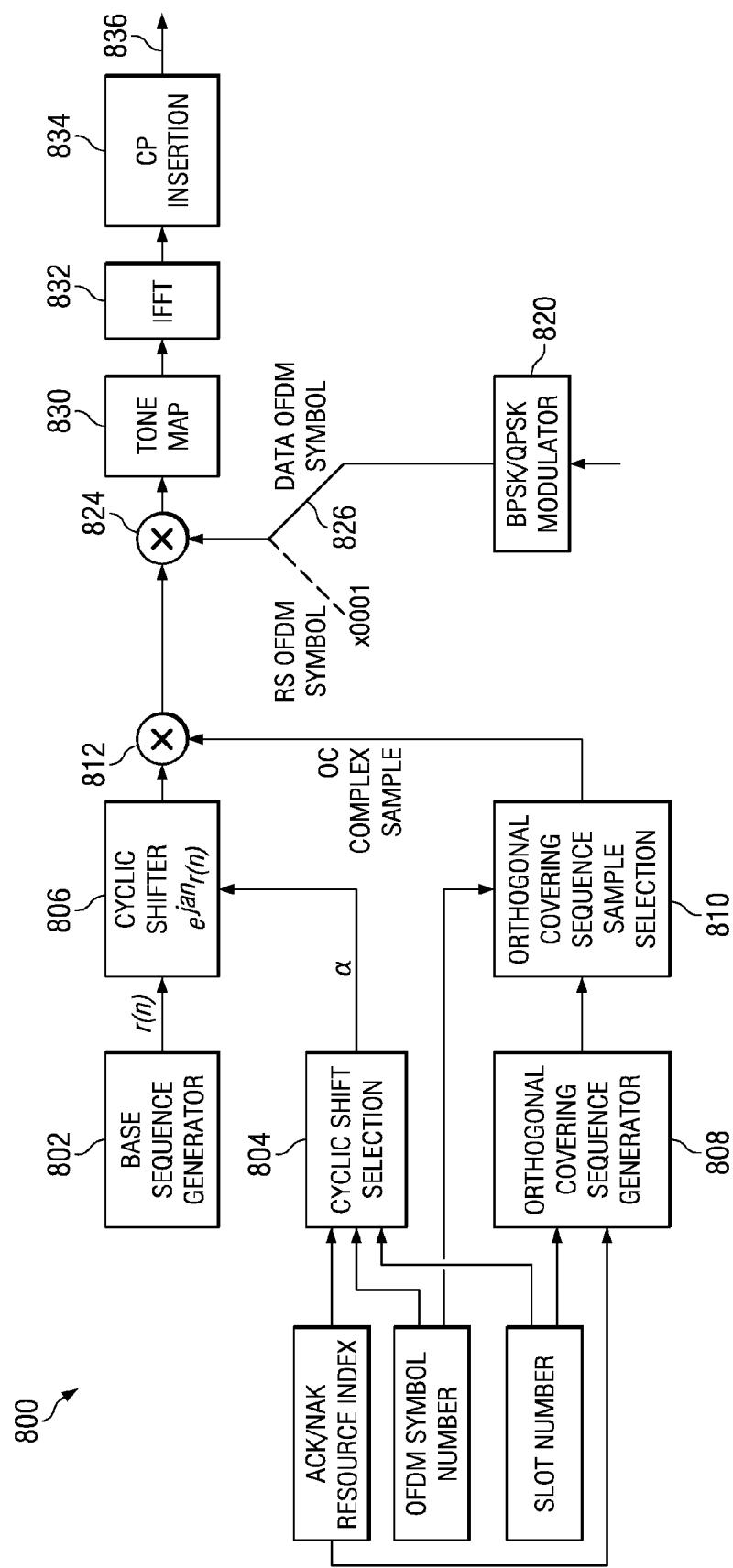
FIG. 6 is a block diagram of an illustrative transmitter for transmitting the coherent ACKNAK structures of FIGS. 2A-2B.

FIG. 6 is a block diagram of an illustrative transmitter 800 for transmitting the coherent structures of FIGS. 2A-2B, and 5. Elements of the transmitter may be implemented as components in a fixed or programmable processor by executing instructions stored in memory. The UE generates a CAZAC-like (e.g. ZC or extended ZC or zero-autocorrelation QPSK computer-generated) sequence using base sequence generator 802. A cyclic shift value is selected for each symbol based on the ACK/NAK resource index (in the ACK/NAK multiplex), the OFDM symbol number and the slot number in cyclic shift selecting module 804. The base sequence is then shifted by cyclic shifter 806 on a symbol by symbol basis using shift values provided by cyclic shift selection module 804.

The UE generates both RS and data orthogonal covering sequences 217 and 218, for example, using orthogonal sequence generator 808. The sequence length is equal to the number of covered OFDM symbols. The number of data OFDM symbols is four in both FIGS. 2A and 2B examples. Sequences used for this orthogonal covering are typically length-4 Walsh-Hadamard sequences, taken from the following set of sequences: $\{(1,1,1,1), (1,-1,1,-1), (1,-1,-1,1)\}$. The number of RS OFDM symbols is three in FIG. 2A and two in FIG. 2B examples. Sequences used for this orthogonal covering are either length-2 Walsh-Hadamard sequences, taken from the following set of sequences: $\{(1,1), (1,-1)\}$ or length-3 DFT sequences taken from the following set of sequences: $\{(1,1,1), (1,e^{j2pi/3}, e^{j4pi/3}), (1, e^{j4pi/3}, e^{j2pi/3})\}$. Orthogonal sequence generator 808 generates one sequence out of the set of orthogonal sequences based on the ACK/NAK resource index (in the ACK/NAK multiplex). As described above, the block spreading codes and cyclic shifted root sequences are arranged in the time-frequency resource according to the proposed method, as in the described examples.

The orthogonal covering sequence sample selection 810 selects and issues the appropriate sequence complex sample from the appropriate sequence (RS or data) based on the index of the OFDM symbol being currently generated.

The cyclic shifted base sequence vector is element-wise complex-multiplied by the selected orthogonal covering complex sample in complex multiplier 812.

The data is organized as either one or two bits in this embodiment and is input to modulator block 820. The data bearing OFDM symbols are binary phase shift key (BPSK) or quadrature phase shift key (QPSK) modulated when the data information is one or two bits wide, respectively. The switch 826 selects, based on the OFDM symbol type (data or RS), which of the modulation complex sample or "1" feeds the complex multiplier 824.

The result of the element-wise complex multiplication is mapped onto a designated set of tones (sub-carriers) using the Tone Map 830. The UE next performs IFFT of the mapped signal using the IFFT 832. A cyclic prefix is created and added in module 834 to form a final fully formed uplink signal 836.

Figure 7:
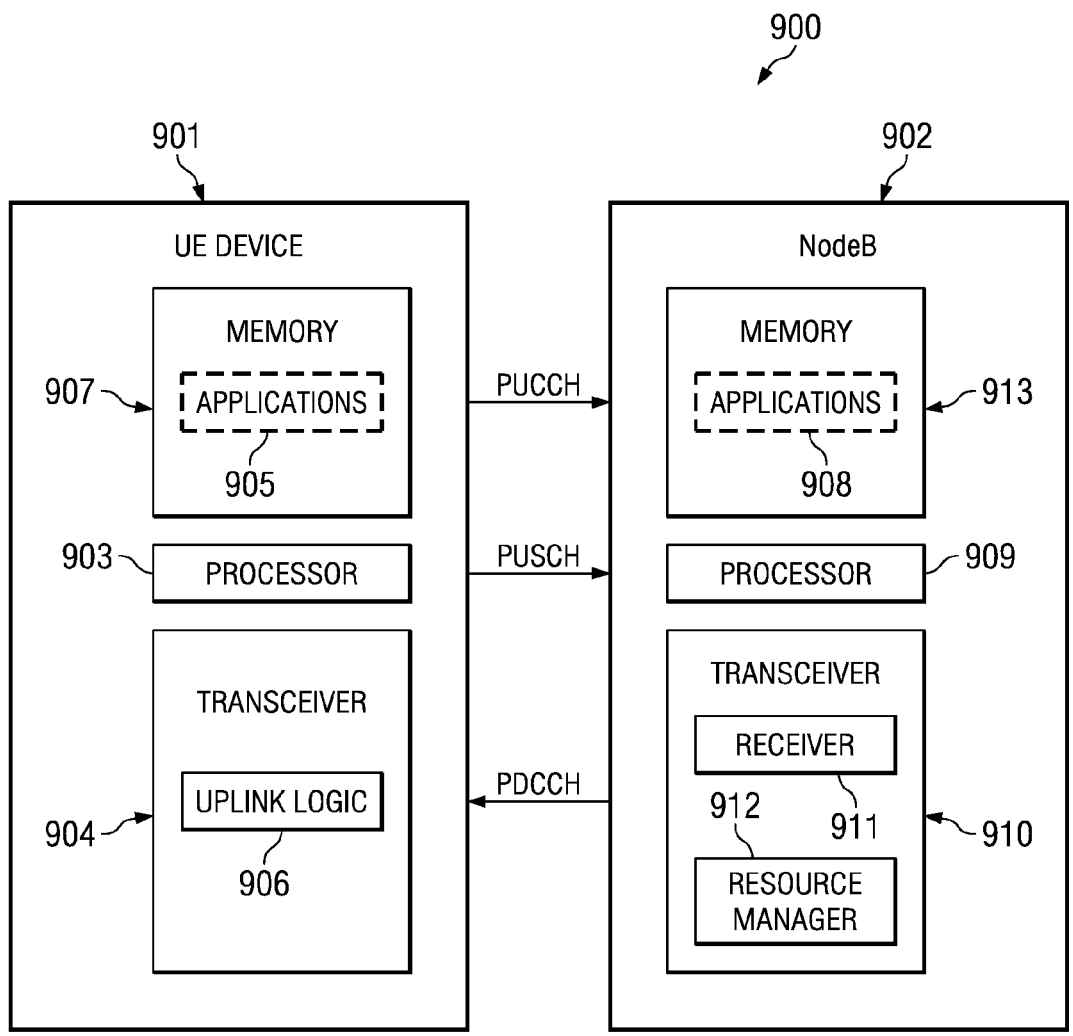
FIG. 7 is a block diagram of a Node B and a User Equipment for use in the network system of FIG. 1.

FIG. 7 is a block diagram illustrating operation of an eNB and a mobile UE in the network system of FIG. 1. As shown in FIG. 9, wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QoS) requirement when requesting an uplink resource from the eNB 902. In some cases, the QoS requirement may be implicitly derived by the eNB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

As shown in FIG. 9, the transceiver 904 comprises uplink logic 906. The uplink logic executes instructions that control the operation of the transceiver. Some of these instructions may be stored in memory 907 and executed when needed. As would be understood by one of skill in the art, the components of the Uplink Logic 906 may involve the physical (PHY) layer and/or the Media Access Control (MAC) layer of the transceiver 904. Transceiver 904 includes one or more receivers and one or more transmitters. The transmitter(s) may be embodied as described with respect to FIG. 6. In particular, as described above, for the transmission of ACK/NAK, the block spreading codes and cyclic shifted root sequences are arranged in the time-frequency resource according to the proposed method, as in the described examples. In some embodiments, other types of transmissions by the UE may also use the covering sequence selection method as described herein.

As shown in FIG. 9, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. In particular, for the transmission of ACK/NAK, eNB 902 arranges the block spreading codes and cyclic shifted root sequences in the time-frequency resource according to the proposed method, as in the described examples.

Figure 8:
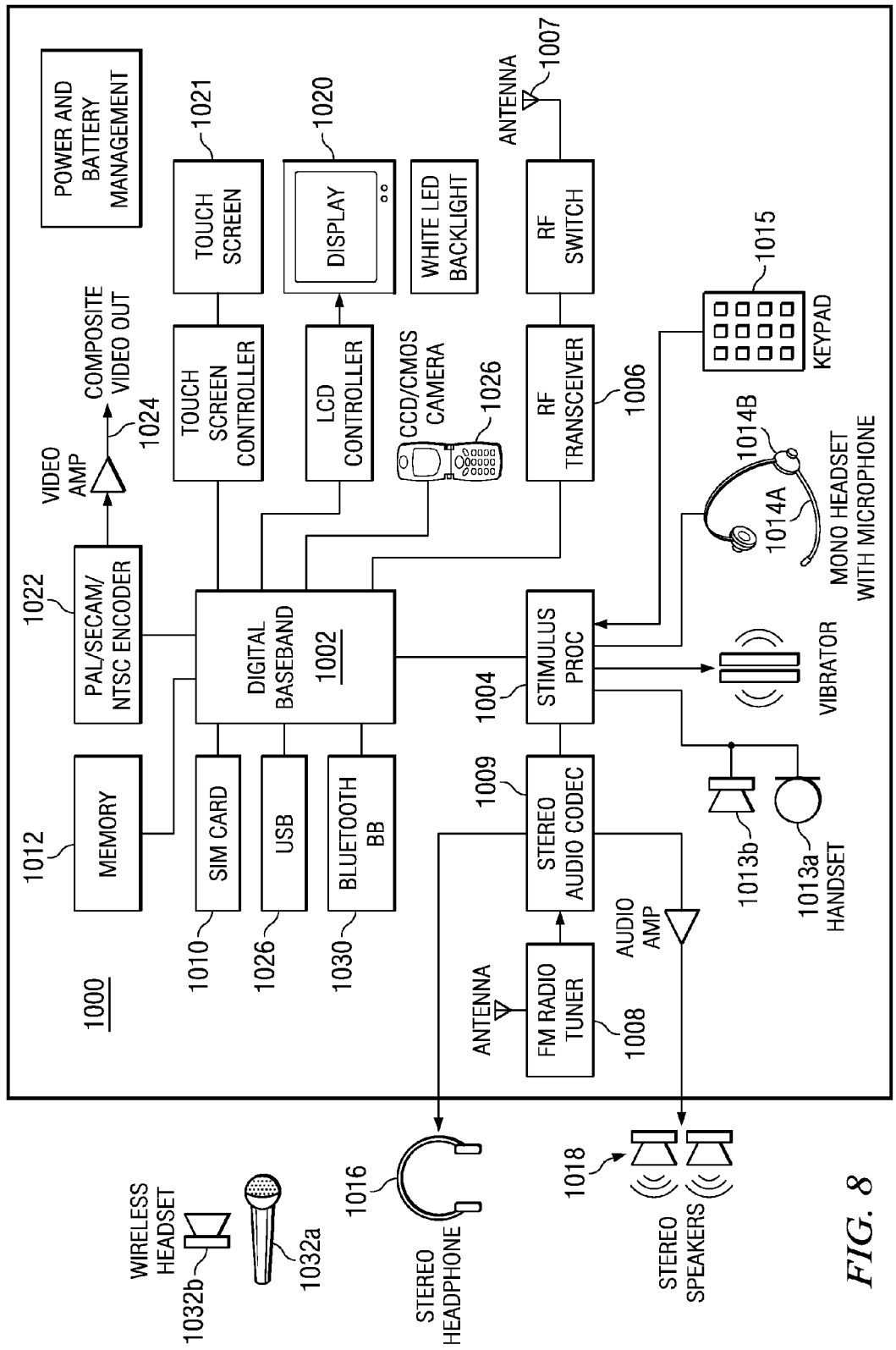
FIG. 8 is a block diagram of a cellular phone for use in the network of FIG. 1.

FIG. 8 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For ACK/NAK transmission, a transmitter(s) within transceiver 1006 may be embodied as described with respect to FIG. 6. In particular, as described above, for the transmission of ACK/NAK, the block spreading codes and cyclic shifted root sequences are arranged in the time-frequency resource according to the proposed method, as in the described examples In some embodiments, other types of transmissions by the UE may also use the covering sequence selection method as described herein.

In 3GPP LTE UL, a similar structure is defined for the transmission of scheduling request indicator (SRI), as for ACK/NAK. The different between the transmission of ACK/NAK and SRI is that ACK/NAK is BPSK/QPSK modulated, depending on the number of ACK/NAK bits, while SRI is ON-OFF keying modulated. The proposed method for arranging the block spreading codes and cyclic shifted root sequences in the time-frequency resource can be equally applied to the transmission of SRI.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot. Block spreading codes can be assigned as described herein for transmission of data and control information, including but not limited to ACK/NAK and SRI.

In another embodiment, an eNB is configured to send indications of selected sequences to user equipment to be used for forming transmission signals by the UE. The eNB has circuitry for sending an indication of a first sequence from a primary node to at least one secondary node, wherein the first sequence is of length N, and wherein the first sequence is selected from a restricted sequence set comprising of M sequences of length N each, wherein M<N, and wherein an element-wise product of at least one pair of the first sequences from the restricted sequence set results in a mirror-symmetric sequence. The eNB has circuitry for sending an indication of a second sequence from the primary node to at most two secondary nodes, wherein the second sequence comprises at least two samples; and wherein indications of both sequences pertain to a time-frequency resource. The eNB also has circuitry for receiving a transmission signal produced by the secondary node, wherein transmission signal comprises a time duration set comprising of N logical time durations, wherein the transmission signal in a K-th logical time duration is generated by operating on the entire second sequence with the K-th element of the first sequence.

In another embodiment, a user equipment (UE) performs transmission of information using sequences in a wireless communication system by producing a sequence, wherein the sequence is within a set of sequences, wherein each sequence from the set is a phase ramped root sequence, wherein the amount of phase ramp is a monotonic function of an index of the sequence within the set, wherein the set of sequences comprises at least three mutually exclusive subsets such that each subset comprises at least one sequence, wherein an index of any sequence in a first subset is smaller than an index of any sequence in a second subset, an index of any sequence in the second subset is smaller than an index of any sequence in a third subset; and wherein the second subset is a guard subset. The UE determines a type of the information, wherein the type of information comprises at least a first type and a second type. The UE selects a sequence from the set of sequences, wherein a sequence is either selected from the first set if the information is of the first type or selected from the third set if the information is of the second type. The UE then produces a transmission signal using the information and the selected sequence.

In another embodiment, a base station (eNB) is configured for operating a wireless network using sequences for transmission of information. The eNB has circuitry for holding a representation of a set of sequences comprising at least three mutually exclusive subsets such that each subset comprises at least one sequence, wherein each sequence from the set of sequences is a phase ramped root sequence and the amount of phase ramp is a monotonic function of an index of the sequence within the set, wherein an index of any sequence in the first subset is smaller than an index of any sequence in the second subset, and an index of any sequence in the second subset is smaller than an index of any sequence in the third subset; wherein the second subset is a guard subset. The eNB has circuitry for indicating the type of information to a user equipment (UE), wherein the type of information comprises at least a first type and a second type. Based on the type of information, the eNB has circuitry for indicating to the UE either a sequence from the first set of sequences if the information is of the first type or a sequence from the third set of sequences if the information is of the second type. The eNB also has circuitry for receiving a transmission signal from the UE; wherein the transmission signal is produced using the information and the indicated sequence.

In another embodiment, a user equipment has circuitry for receiving an indication of a first sequence from an eNB, wherein the first sequence is of length N, and wherein the first sequence is selected from a restricted set comprising M sequences of length N each, wherein M<N. The circuitry is also operable to receive an indication of a second sequence from a primary node at the UE, wherein the second sequence comprises at least two samples; and wherein indications of both sequences pertain to a time-frequency resource. The eNB has circuitry for producing a first sequence by using the received indication and for producing a second sequence using the received indication. The UE has circuitry for forming a transmission signal comprising a plurality of logical time durations, wherein a K-th logical time duration the transmission signal is generated by operating on the entire second sequence with the K-th element of the first sequence.

It is therefore contemplated that the appended claims will cover any such modifications of the embodiments as fall within the true scope and spirit of the invention.

What is claimed is:

1. A method for operating a wireless communication system, comprising:
    sending an indication of a first sequence from a primary node to at least one secondary node, wherein the first sequence is of length N, and wherein the first sequence is selected from a restricted sequence set comprising of M sequences of length N each, wherein M<N, and wherein an element-wise product of at least one pair of the first sequences from the restricted sequence set results in a mirror-symmetric sequence;
    sending an indication of a second sequence from the primary node to at most two secondary nodes, wherein the second sequence comprises at least two samples; and wherein indications of both sequences pertain to a time-frequency resource; and
    receiving a transmission signal produced by the secondary node, wherein transmission signal comprises a time duration set comprising of N logical time durations, wherein the transmission signal in a K-th logical time duration is generated by operating on the entire second sequence with the K-th element of the first sequence.

2. The method of claim 1, wherein each logical time duration is an OFDM symbol, and wherein sending indications of the first and second sequence comprises:
    transmitting from the first node to a secondary node using a control channel element with index L; and
    deriving the first sequence and the second sequence at the secondary node using L.

3. The method of claim 1, wherein each logical time duration is an OFDM symbol, and wherein sending indications of the first and second sequences comprises:
    transmitting an index L from the first node to a secondary node; and
    deriving the first sequence and the second sequence at the secondary node using L.

4. The method of claim 1,
    wherein the indication of a second sequence is sent to a first secondary node and to a second secondary node;
    wherein sending an indication of a first sequence comprises sending an indication of a first sequence to the first secondary node and sending an indication of a second first sequence to the second secondary node; and
    wherein the first sequence and the second first sequence comprise a pair whose element-wise product is mirror-symmetric.

5. The method of claim 4 wherein the restricted set consists of three sequences: [1 1 1 1], [1 −1 1 −1], and [1 −1 −1 1], and wherein the first sequence is [1 1 1 1] and the second first sequence is [1 −1 −1 1].

6. The method of claim 1, wherein the second sequence is selected from a set of second sequences, and wherein the second sequence is a phase-ramped root sequence, and wherein the set of second sequences is ordered so that the amount of phase ramp is a monotonic function of the index of the second sequence.

7. The method of claim 6, wherein the indication of a first sequence is sent to a first secondary node and to a second secondary node; and
    wherein sending an indication of a second sequence comprises sending an indication of a first second sequence to the first secondary node, and sending an indication of a second second sequence to the second secondary node; and wherein the index of the first second sequence and the index of the second sequence differ by at least 2.

8. The method of claim 7, further comprising:
    sending indication of a second first sequence to a third secondary node;
    sending indication of the first second sequence to the third secondary node; and
    wherein the first sequence and the second first sequence comprise a pair whose element-wise product is mirror-symmetric.

9. The method of claim 8 wherein the restricted set consists of three sequences: [1 1 1 1], [1 −1 1 −1], and [1 −1 −1 1], and wherein the first sequence is [1 1 1 1] and the second first sequence is [1 −1 −1 1].

10. The method of claim 7, wherein the restricted set consists of three sequences: [1 1 1 1], [1 −1 1 −1], and [1 −1 −1 1].

11. The method of claim 7 wherein the restricted set consists of two sequences: [1 1 1 1] and [1 −1 −1 1].

12. The method of claim 1, wherein an element of uplink control information (UCI) is used to produce the transmission signal at the secondary node, and wherein the element of UCI is selected from a set consisting of: ACKNAK information, scheduling request indicator (SRI), and rank indicator (RI).

13. A user equipment apparatus (UE) for transmission of information using sequences in a wireless communication system, comprising:
    means for producing a sequence, wherein the sequence is within a set of sequences, wherein each sequence from the set is a phase ramped root sequence, wherein the amount of phase ramp is a monotonic function of an index of the sequence within the set, wherein the set of sequences comprises at least three mutually exclusive subsets such that each subset comprises at least one sequence, wherein an index of any sequence in a first subset is smaller than an index of any sequence in a second subset, an index of any sequence in the second subset is smaller than an index of any sequence in a third subset; and wherein the second subset is a guard subset;
means for determining a type of the information, wherein the type of information comprises at least a first type and a second type;
means for selecting a sequence from the set of sequences, wherein a sequence is selected from the first set if the information is of the first type or selected from the third set if the information is of the second type; and
means for producing a transmission signal using the information and the selected sequence.

14. The UE of claim 13, wherein the first type of information is ACKNAK information or a scheduling request indicator (SRI); and wherein the second type of information is a channel quality indicator (CQI).

15. A method for operating a wireless network using sequences for transmission of information; comprising:
holding in a first node a representation of a set of sequences comprising at least three mutually exclusive subsets such that each subset comprises at least one sequence, wherein each sequence from the set of sequences is a phase ramped root sequence and the amount of phase ramp is a monotonic function of an index of the sequence within the set, wherein an index of any sequence in the first subset is smaller than an index of any sequence in the second subset, and an index of any sequence in the second subset is smaller than an index of any sequence in the third subset; wherein the second subset is a guard subset;
indicating to a second node the type of information, wherein the type of information comprises at least a first type and a second type;
indicating to the second node a sequence from the first set of sequences if the information is of the first type;
indicating to the second node a sequence from the third set of sequences if the information is of the second type; and
receiving a transmission signal from the second node; wherein the transmission signal is produced using the information and the indicated sequence.

16. The method of claim 15, wherein the first type of information is either ACKNAK information or a scheduling request indicator (SRI); and wherein the second type of information is a channel quality indicator (CQI).

17. A method for transmission in a wireless communication system, comprising:
receiving an indication of a first sequence from a primary node at a user equipment (UE), wherein the first sequence is of length N, and wherein the first sequence is selected from a restricted set comprising M sequences of length N each, wherein M<N;
receiving an indication of a second sequence from a primary node at the UE, wherein the second sequence comprises at least two samples; and wherein indications of both sequences pertain to a time-frequency resource;
producing a first sequence at the UE by using the received indication;
producing a second sequence at the UE by using the received indication; and forming a transmission signal by the UE, wherein the transmission signal comprises a plurality of logical time durations, wherein a K-th logical time duration of the transmission signal is generated by operating on the entire second sequence with the K-th element of the first sequence.

18. The method of claim 17, wherein the restricted set consists of three sequences: [1 1 1 1], [1 −1 1 −1], and [1 −1 −1 1].

19. The method of claim 17, wherein the restricted set consists of two sequences: [1 1 1 1] and [1 −1 −1 1].

20. The method of claim 17, wherein an element of uplink control information (UCI) is used to produce the transmission signal at the secondary node; and wherein the element of UCI is selected from the set consisting of: ACKNAK information, scheduling request indicator (SRI), and rank indicator (RI).

21. The method of claim 17, further comprising
receiving a signal on a control channel element with index L, such that $f(L)$ is the index of the produced first sequence, and $s(L)$ is the index of the produced second sequence;
wherein the second sequence is a phase-ramped root sequence, and the amount of phase ramp is a monotonic function of the index $s(L)$ of the second sequence;
wherein L belongs to a set comprising of at least L1 and L2;
wherein functions f and s are designed so that $|s(L1)-s(L2)| \geq \Delta$ whenever $f(L1)=f(L2)$, where $\Delta$ is a configured integer value; and
wherein the element-wise product of $f(L1)$ and $f(L2)$ is mirror symmetric whenever $s(L1)=s(L2)$.

22. The method of claim 21, wherein index L belongs to a set comprising L1, L2, L3, L4, L5, L6, L7, L8, L8, L9, L10, L11, L12, L13, L14, L15, L16, L17, L18, wherein $f(L1)$, $f(L2)$, $f(L3)$, $f(L4)$, $f(L5)$, $f(L6)$ map to the index of the first sequence [1 1 1 1], wherein $f(L7)$, $f(L8)$, $f(L9)$, $f(L10)$, $f(L11)$, $f(L12)$ map to the index of the first sequence [1 −1 1 −1], wherein $f(L13)$, $f(L14)$, $f(L15)$, $f(L16)$, $f(L17)$, $f(L18)$ map to the index of the first sequence [1 −1 −1 1], wherein $s(L1)=s(L13)=0$, $s(L2)=s(L14)=2$, $s(L3)=s(L15)=4$, $s(L4)=s(L16)=6$, $s(L5)=s(L17)=8$, $s(L6)=s(L18)=10$, $s(L7)=1$, $s(L8)=3$, $s(L9)=5$, $s(L10)=7$, $s(L11)=9$, $s(L12)=11$.

23. The method of claim 21, wherein index L belongs to a set comprising L1, L2, L3, L4, L5, L6, L7, L8, L8, L9, L10, L11, L12, L13, L14, L15, L16, L17, L18, wherein $f(L1)$, $f(L2)$, $f(L3)$, $f(L4)$, $f(L5)$, $f(L6)$ map to the index of the first sequence [1 1 1 1], wherein $f(L7)$, $f(L8)$, $f(L9)$, $f(L10)$, $f(L11)$, $f(L12)$ map to the index of the first sequence [1 −1 1 −1], wherein $f(L13)$, $f(L14)$, $f(L15)$, $f(L16)$, $f(L17)$, $f(L18)$ map to the index of the first sequence [1 −1 −1 1], wherein $s(L1)=s(L13)=1$, $s(L2)=s(L14)=3$, $s(L3)=s(L15)=5$, $s(L4)=s(L16)=7$, $s(L5)=s(L17)=9$, $s(L6)=s(L18)=11$, $s(L7)=2$, $s(L8)=4$, $s(L9)=6$, $s(L10)=8$, $s(L11)=10$, $s(L12)=0$.

24. The method of claim 17, further comprising
receiving an index L, such that $f(L)$ is the index of the produced first sequence, and $s(L)$ is the index of the produced second sequence;
wherein the second sequence is a phase-ramped root sequence, and the amount of phase ramp is a monotonic function of the index $s(L)$ of the second sequence;
wherein L belongs to a set comprising of at least L1 and L2;
wherein functions f and s are designed so that $|s(L1)-s(L2)| \geq 2\Delta$ whenever $f(L1)=f(L2)$, where $\Delta$ is a configured integer value; and
wherein the element-wise product of $f(L1)$ and $f(L2)$ is mirror symmetric whenever $s(L1)=s(L2)$.

* * * * *